Figure 1:
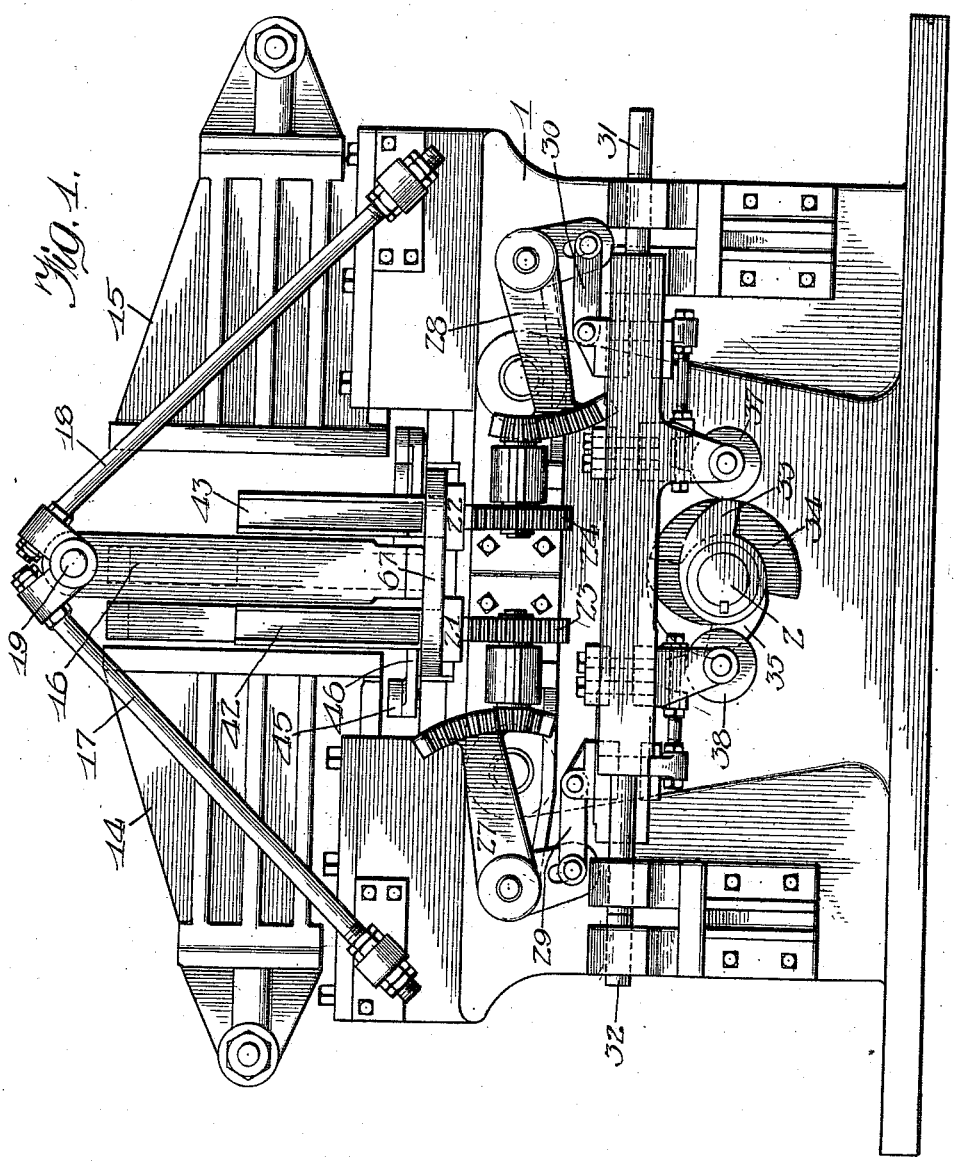

F. K. CASWELL.
BRAKE SHOE MACHINE.
APPLICATION FILED DEC. 17, 1906.

973,169.

Patented Oct. 18, 1910.
8 SHEETS—SHEET 1.

Witnesses:

Inventor:
F. K. Caswell
by Brown, Darby & Hopkins
Attys

F. K. CASWELL.
BRAKE SHOE MACHINE.
APPLICATION FILED DEC. 17, 1906.

973,169.

Patented Oct. 18, 1910.

8 SHEETS—SHEET 3.

F. K. CASWELL.
BRAKE SHOE MACHINE.
APPLICATION FILED DEC. 17, 1906.
973,169.
Patented Oct. 18, 1910.
8 SHEETS—SHEET 4.
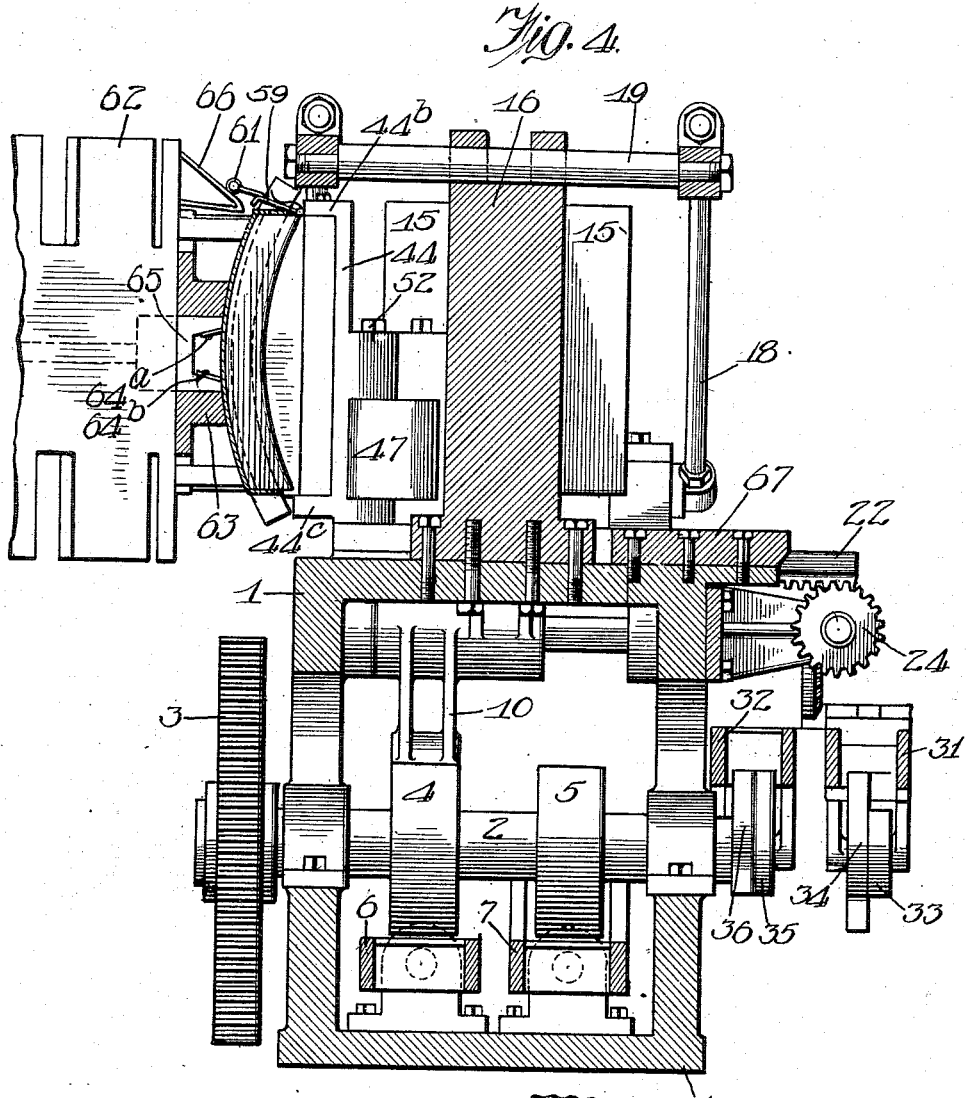
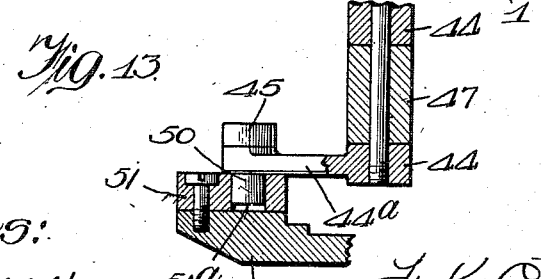

F. K. CASWELL.
BRAKE SHOE MACHINE.
APPLICATION FILED DEC. 17, 1906.
973,169.
Patented Oct. 18, 1910.
8 SHEETS—SHEET 5.
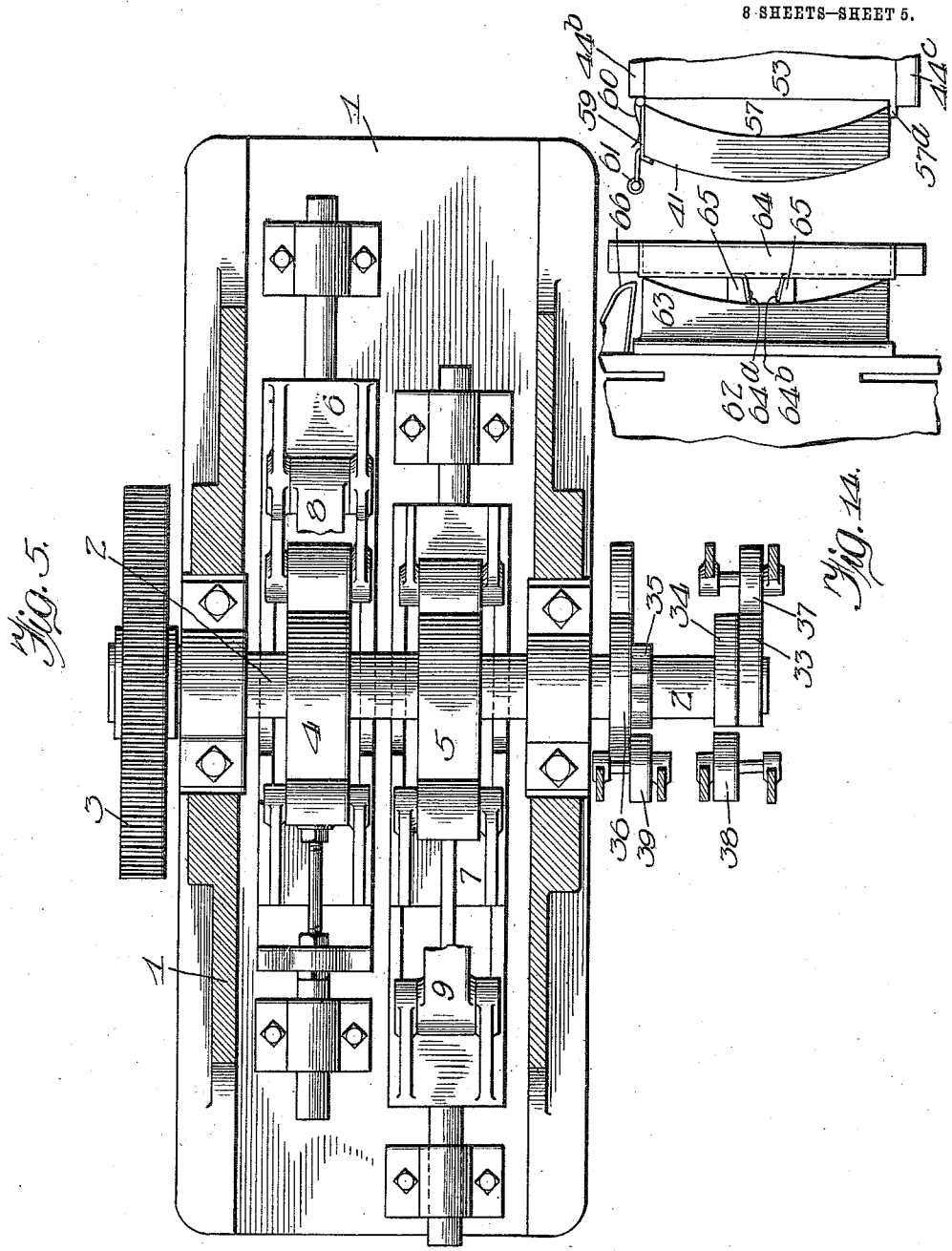
Witnesses:
Inventor:
F. K. Caswell
by Brown, Darby & Hopkins
Attys

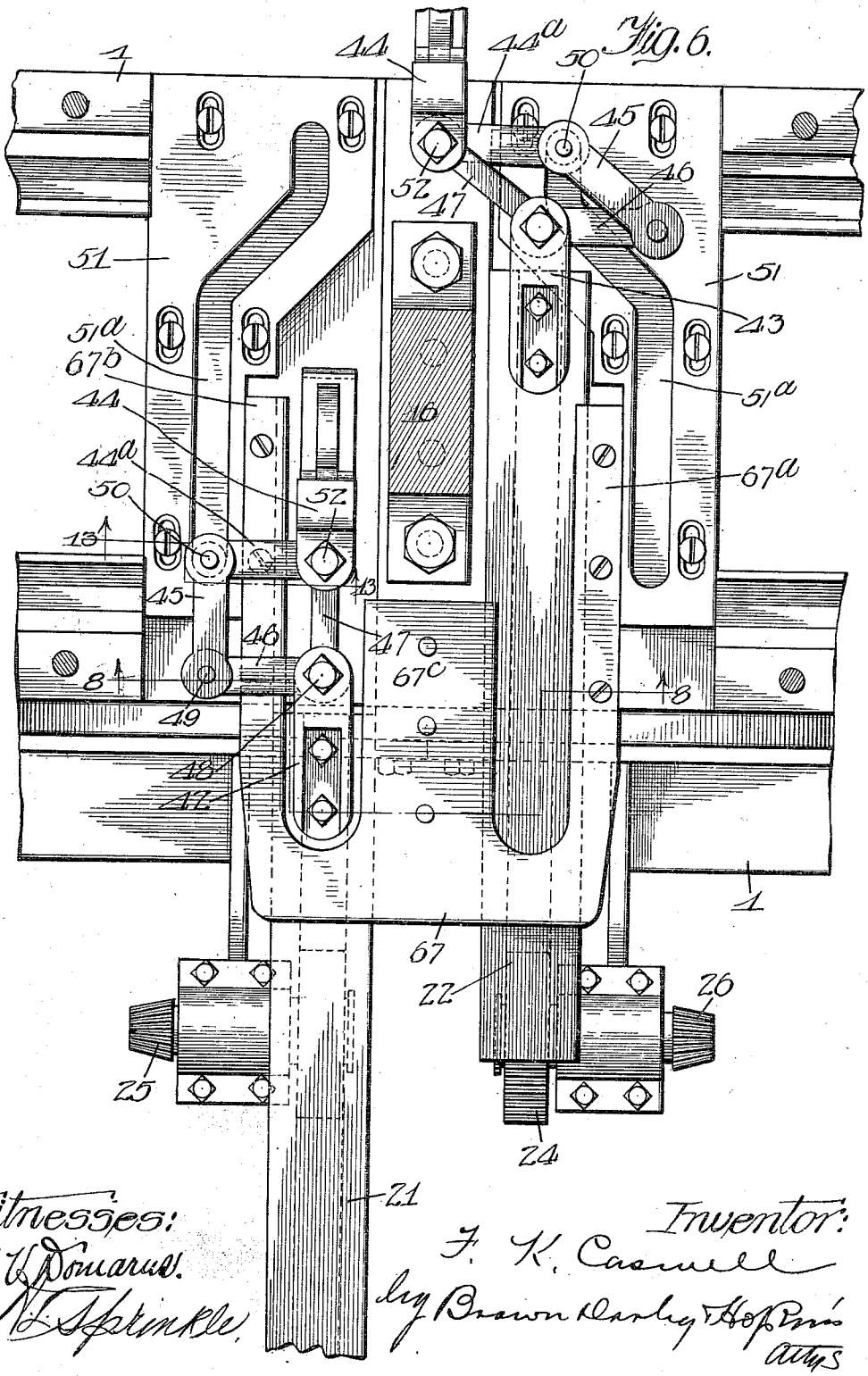

F. K. CASWELL.
BRAKE SHOE MACHINE.
APPLICATION FILED DEC. 17, 1906.
973,169.
Patented Oct. 18, 1910.
8 SHEETS—SHEET 7.
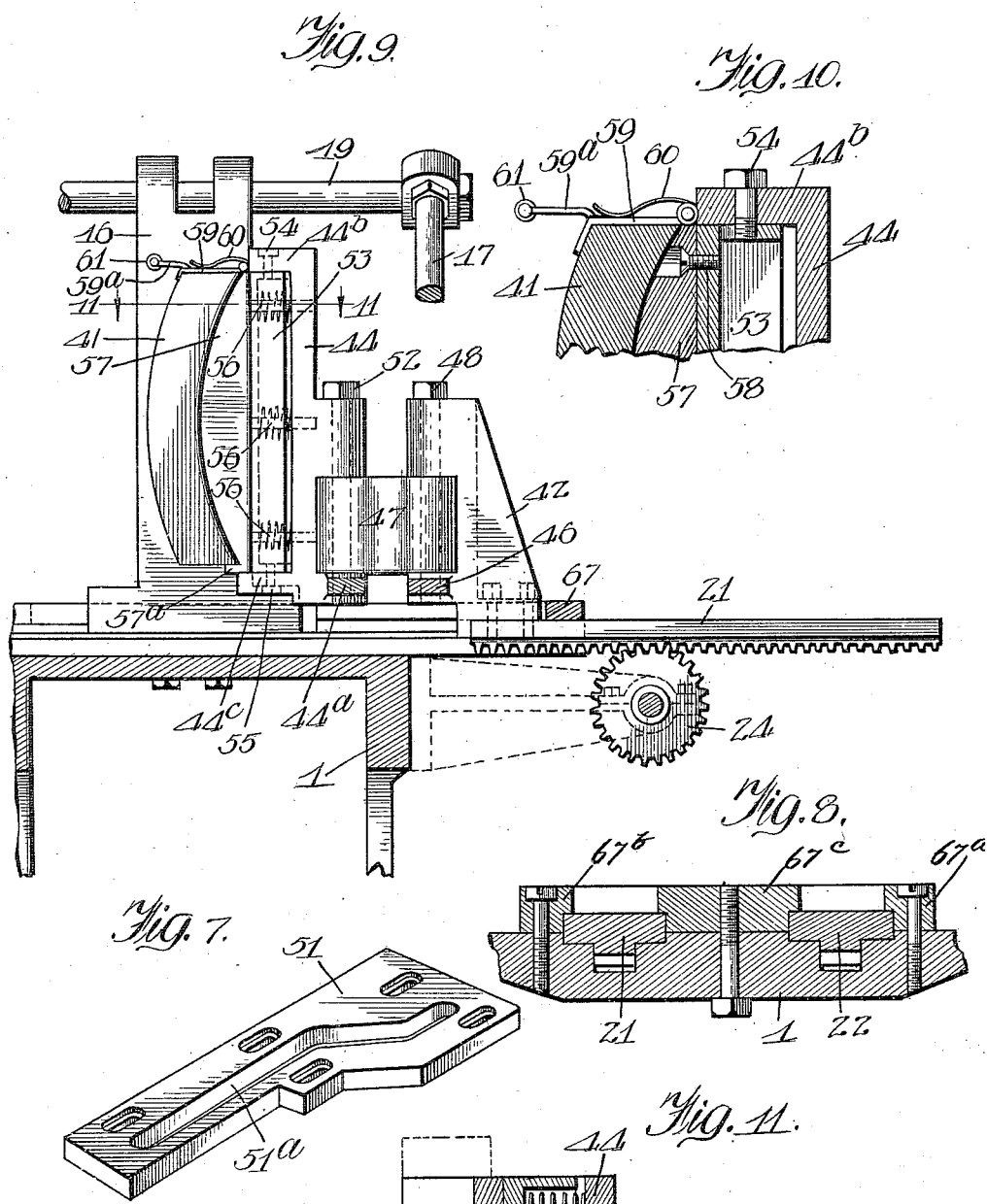

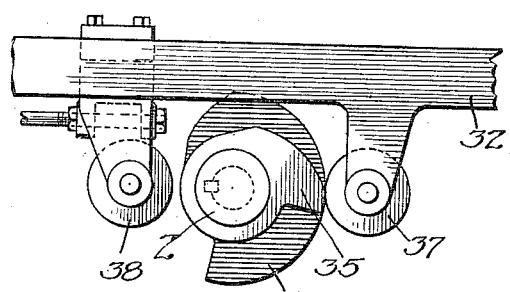
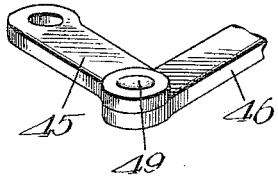
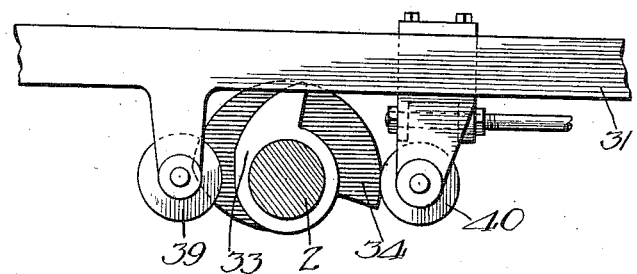
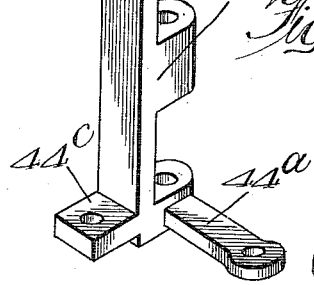
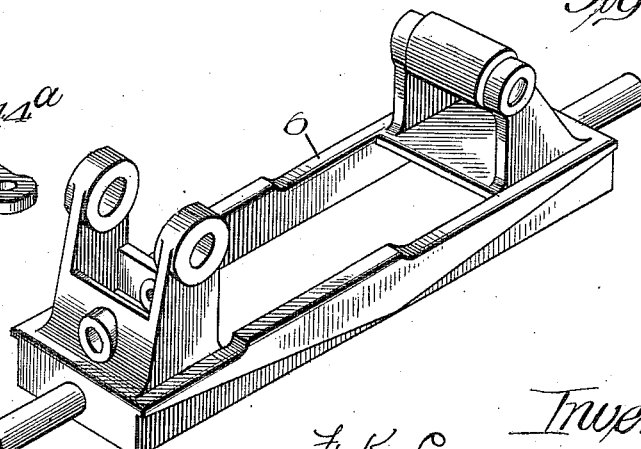

UNITED STATES PATENT OFFICE.

FREDERICK K. CASWELL, OF LOS ANGELES, CALIFORNIA, ASSIGNOR TO PAUL DICKINSON (INCORPORATED), OF CHICAGO, ILLINOIS, A CORPORATION OF WYOMING.

BRAKE-SHOE MACHINE.

973,169. Specification of Letters Patent. Patented Oct. 18, 1910.

Application filed December 17, 1906. Serial No. 348,177.

*To all whom it may concern:*

Be it known that I, FREDERICK K. CASWELL, a citizen of the United States, residing at Los Angeles, in the county of Los Angeles and State of California, have invented certain new and useful Improvements in Brake-Shoe Machines, of which the following is a full, clear, and exact specification.

The invention relates to machines for making brake-shoes and more particularly to machines of the general class described in my co-pending application on automatic brake-shoe machine of which machine the specific mechanism of the present invention forms a part, although as it will appear hereinafter in the present specification machines embodying this invention may be used independently of other mechanisms in the manufacture of brake-shoes.

The primary object of the invention is to provide an improved machine adapted to form blocks or bodies of fibrous or other materials possessing high frictional qualities and to insert such blocks or bodies of filling material into brake-shoe shells or holders.

A further object of the invention is to provide an improved machine for performing the work indicated, such machine being adapted to insert the prepared filling material into brake-shoe shells held in forming matrices and at the same time to apply sufficient pressure to the filling material to impart the curvature of the matrix or of the filling material or both to the brake-shoe shells.

A further object of the invention is to provide an improved mechanism to perform the indicated work that is adapted to be used in conjunction with other automatic machine units for making completed brake-shoes of the general class described in my co-pending application for automatic brake-shoe machines above referred to.

To the attainment of these ends and the accomplishment of other new and useful objects, as will appear, the invention consists in the features of novelty in the construction, combination and arrangement of the several parts hereinafter more fully described and claimed and shown in the accompanying drawings, illustrating an exemplification of this invention and in which—

Figure 2:
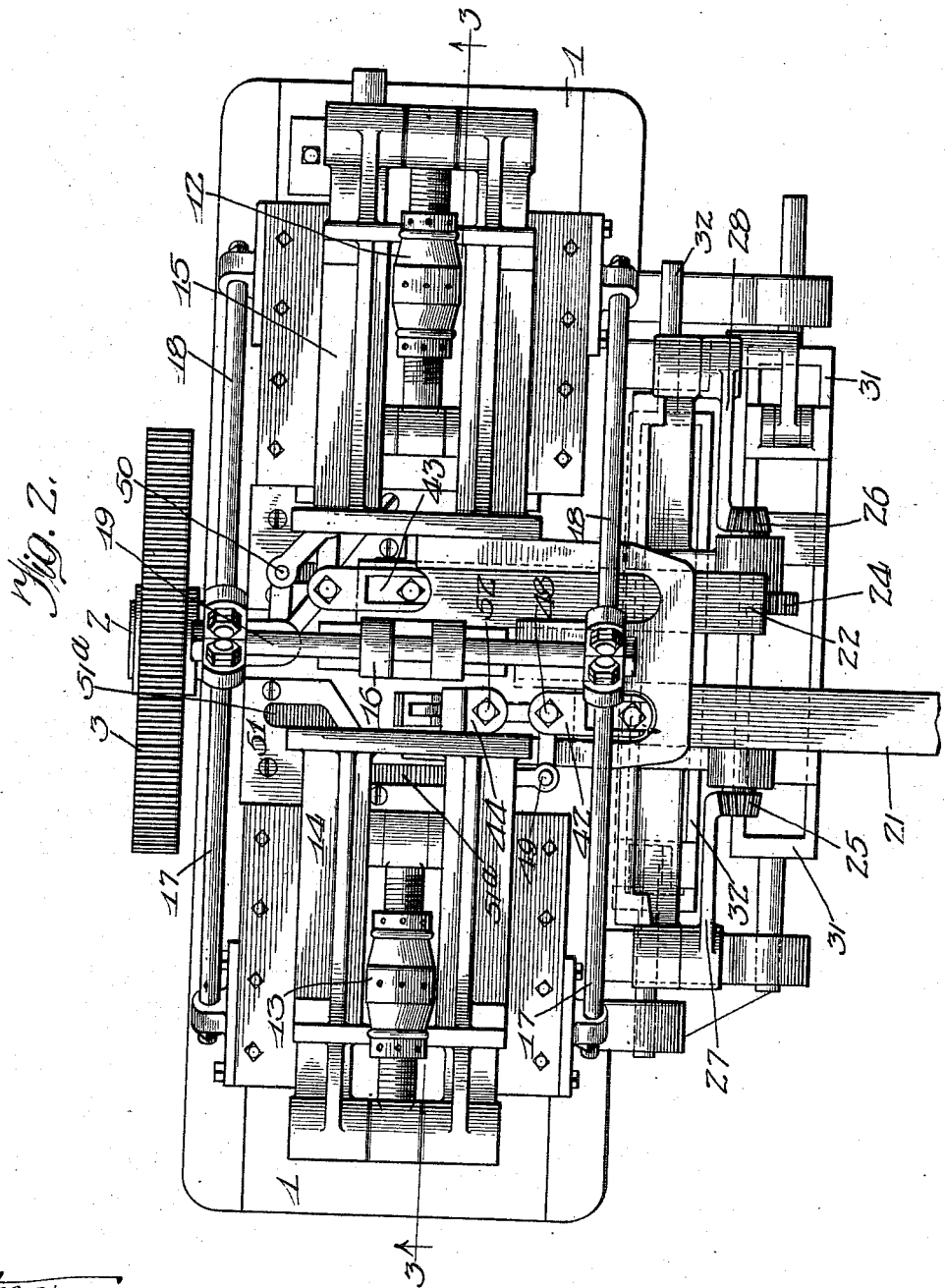
Figure 3:
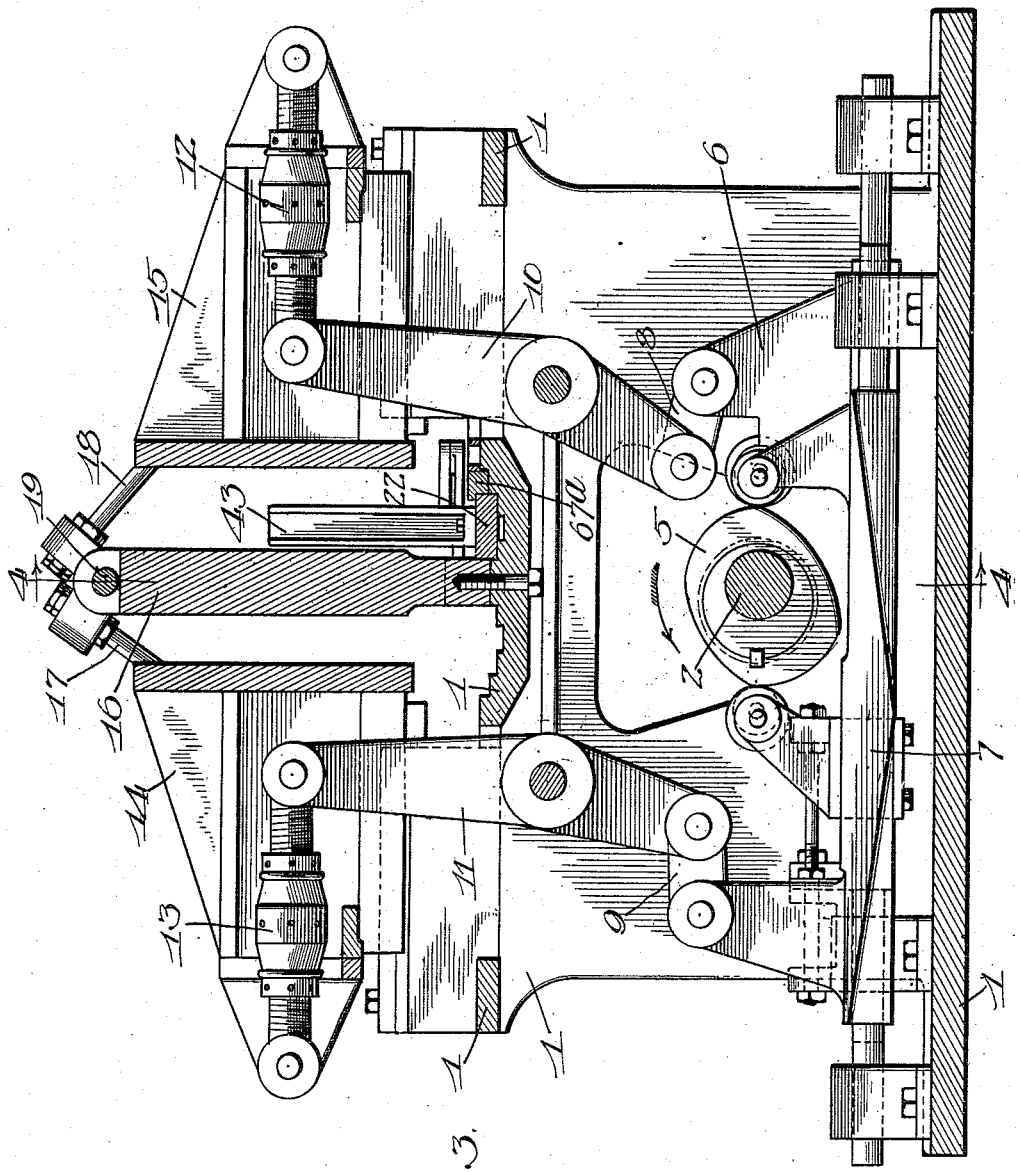

Figure 1 is a view in front elevation of the machine and Fig. 2 is a plan view of the same. Fig. 3 is a longitudinal vertical section taken approximately on line 3—3, Fig. 2. In this view one of the filling block plungers and the mechanism operating the same is not shown, the reason being that the machine is in such position that one of the plungers is in the act of inserting a filling block, which carries the mechanism out of view. Fig. 4 is a vertical, cross sectional view of the machine on line 4—4, Fig. 3. To this view is added a shell matrix or holder and the inserting mechanism of the machine is shown in the position that the parts occupy when a filling block has been inserted and pressed home in a shell. Fig. 5 is a horizontal and longitudinal sectional view, disclosing the driving mechanism which is contained in the lower portion of the main frame. Fig. 6 is an enlarged detail view taken from above the machine and embodies the principal operative parts used in compressing the filling material and for inserting the same within the brake-shoe shells. Fig. 7 is a perspective view of one of the plates mounted on top of the main frame and used for the purpose of guiding the block or filler inserting mechanism. Fig. 8 is a sectional view on line 8—8, Fig. 6. Fig. 9 is a detail view showing a portion of the main frame and the block or filler inserting mechanism. In this view a block of filling material is shown in position against the face of the central abutting member, against which both of the reciprocating heads or plungers operate in compressing the filling material. Fig. 10 is a broken detail sectional view of the block or filler holding mechanism shown in Fig. 9. Fig. 11 is a detail sectional view on line 11—11, Fig. 9. Fig. 12 is an enlarged detail view of one of the pivoted frames which forms a part of the filler plunger. Fig. 13 is a broken detail view showing the manner in which the filler plunger mechanism is guided in the main frame by means of the member shown in detail in Fig. 7. Fig. 14 is a detail view in side elevation of a brake-shoe shell matrix or holder and a brake-shoe shell formed of sheet metal in position thereon. The relative position of the block or filler plunger is illustrated, the same being the position of the parts just before the insertion of the filling material into the shell and the resulting process of imparting the curvature of the filler and of the matrix to the shell. In Fig. 4 the relative position of the parts after the insertion is completed is shown. Fig. 15 is a detail view of a portion of the link mechanism of the filler plunger. Fig. 16 is a detail view of one of the reciprocating driving members, of which there are two mounted contiguous to the eccentrically mounted driving cams on the main driving shaft. The design of the reciprocating members for imparting movement to the filler plungers is similar to the member shown in this figure except that it will be noted that in this embodiment of the invention the anti-friction roller brackets are carried on the under side. Figs. 17 and 18 are detail views of the cams and their contiguous reciprocating members, which are parts of the mechanism imparting movement to the reciprocating filler plungers.

1 is the main frame, 2 the main driving shaft, which is journaled in the main frame preferably near the bottom thereof for the purpose of giving a certain degree of strength and uniformity, which will be more apparent by referring to the entire mechanism disclosed in my above mentioned co-pending application on automatic brake-shoe machine.

3 is a driving gear on the main shaft adapted to have movement imparted to it from the driving shaft of an adjoining machine or in any other convenient manner.

4 and 5 are eccentrically mounted cams carried by main driving shaft 2 for the purpose of imparting movement to the contiguous reciprocating members 6 and 7. Movement is imparted by the members 6 and 7 through links 8 and 9, rock levers 10 and 11 and adjustable links 12 and 13 to the main reciprocating heads or rams 14 and 15.

16 is a stationary abutting member secured at its base to the top of the main frame and extending vertically to a point flush with or above the top of the heads 14 and 15 and is adapted to serve as a firm abutting member against which reciprocating heads 14 and 15 may act for the purpose of compressing the filling material as hereinafter described. The abutting members 16 may be strengthened by the diagonal supporting braces 17 and 18 running from the top thereof to the main frame. There may be two sets of the supporting braces 17 and 18 connected as in the illustration (see Fig. 4) by the cross member 19, which is secured in the top of member 16.

The top of the main frame is provided with suitable means for retaining the reciprocating racks 21, 22. The under side of these members is provided with suitable teeth for engagement by the gears 23 and 24. The gears 23 and 24 are mounted on short shafts journaled in the main frame, the bevel gears 25 and 26 being mounted on the other ends of these shafts. Rotation to the bevel gears 25 and 26 in alternate directions is imparted through the bell cranks 27 and 28, which are mounted to rock on the main frame, one end of each of these bell cranks being provided with segmental gears suitable for engaging the bevel gears 25 and 26. Links 29 and 30 connect the opposite arms of bell cranks 27 and 28 with the reciprocating driving members 31 and 32. The reciprocating members 31 and 32 are each provided with a pair of anti-friction rollers mounted on depending brackets: a detailed description of these parts will not be entered into on account of the similarity of the construction to that shown in my co-pending application on feed mechanism. In the present embodiment of the invention, however, it will be noted that I employ two driving cams for each reciprocating member indicated by the numerals 33, 34, 35 and 36; or in other words, I provide a cam for each of the anti-friction rollers 37, 38, 39 and 40. This construction is very desirable on account of the quick return movement required to be imparted to the filler plunger mechanism after the insertion of the filler block in the brake-shoe shell. It will be seen that the position of the driving cams is such that the members 31 and 32 will be moved in opposite directions simultaneously, thus imparting an alternating reciprocating movement to the toothed rack bars 21 and 22; that is, when the rack bar 22 is advanced as shown in Fig. 6 to insert a block or body of filling material, the companion rack 21 will be withdrawn. It should also be observed in this connection that the movements of the main reciprocating heads or rams 14 and 15 approach the central abutting member 16 alternately; that is, when the member 14 reaches the limit of its movement toward 16, the head 15 has just reached the limit of its movement away from the member 16. The heads 14 and 15 are also timed to move in relation to the racks 21 and 22 so that when the rack 21 is in the position shown in Fig. 2, the head 14 is in close proximity to the abutting member 16, while the member 15 moves away from the member 16, thus permitting reciprocating rack 22 to carry the mechanism mounted thereon to the shell matrix or holder.

In the production of a brake-shoe of the character described in my above mentioned application, it is desirable that the blocks of wood or other fibrous substances be compressed to about one-half their normal size before being inserted in the sheet metal shells. Before the blocks are brought to the present machine they are given the form by sawing or in any convenient manner illustrated by the part 41 (see Figs. 9, 10 and 14). In Fig. 9 a block is shown adjacent to the abutting member 16 and is adapted to be approached in this position by one of the heads or rams 14—15 for the purpose of compressing it to about one-half its former thickness. From the position of the block in Fig. 9 the dimension which will be diminished by the pressure of the machine will be apparent. It will be seen that the dimensions of the block, aside from its thickness, will not be affected. Before compressing wood for the purpose of making filling material for brake-shoes, it may be given a variety of treatments well known to those skilled in the art, the most common of which is to extract the saps or juices and to treat the fiber with various solutions of hydrocarbon oils and the like.

Suitable upright standards 42 and 43 are secured to the reciprocating racks 21 and 22. These upright members have pivoted to them a supporting framework designed to hold the blocks of filling material during the moment of compression and during the time that the filling block is moved toward the shell holder or matrix and inserted in the brake-shoe shells held within the matrix. As before explained, it is necessary that this mechanism be constructed to withstand the pressure necessary to give the required degree of curvature to the shell. As the mechanism attached to the upright standard 42 is the same as that attached to standard 43, reference will be made only to the means carried on rack 21. The irregular member 44, provided with the rigid arm 44$^a$, is connected to upright 42 by the pivoted links 45, 46 and 47. It will be noted that the members 44$^a$, 45, 46 and 47 are pivotally connected in the form of a quadrilateral, thus making the common form of parallel ruler movement.

48 is a suitable pin connecting the links 46 and 47 with the member 42. 49 likewise joins links 45 and 46, while the pin 50 joins the link 45 to the integral arm 44$^a$ and projects downwardly a sufficient distance below the surface of the arm 44$^a$ to engage in the guiding slot 51$^a$ of the guide member 51, which is secured to the main frame of the machine.

52 is a suitable pin connecting the link 47 with the member 44.

It will be noted that the member 44 is provided with the widely separated lugs or branches 44$^b$ and 44$^c$ adapted to carry the member 53, which is preferably secured thereto to have a slight movement by means of the retaining pins 54 and 55.

Suitable elastic means, as the springs 56, may be inserted between members 44 and 53. It will be apparent that these springs should be of sufficient size and elasticity to hold the members 44 and 53 comparatively rigid, permitting of only a slight adjustment of these parts with relation to each other during the moment the excessive pressure is applied to the parts in forcing home the filling material within the walls of the shell.

57 is a supplementary form or head which may be detachably secured to member 53 by suitable means as the removable screws 58. It is preferred that the member 57 be removable as shown, as it enables the machine to be readily adapted to handle filling material of various sizes and degrees of curvature, which is accomplished by the removal of the holder 57 and the insertion of another similar holder of the required size. The member 57 is provided at the bottom with a suitable lug 57$^a$ (see Fig. 9) and with the hinged clamping member 59, which is elastically controlled by spring 60 and provided with the arm 59$^a$ carrying the anti-friction roller 61.

In the present embodiment of the invention, it is the purpose to give the main driving shaft 2 a comparatively slow movement in order that the blocks of filling material may remain for a considerable portion of time under compression. It will be seen from the illustrations that the shapes of the driving cams, both for driving the main reciprocating heads 14 and 15 and the feeding mechanism, are provided with ample delay surfaces for the above purpose. This construction enables the feed plunger to remain stationary for some time after it has reached the outward limit of its movement, thus enabling a block 41 of filling material to be inserted by an operator. This insertion is accomplished by placing the filling material in the holder in the manner indicated in Fig. 9, placing its lower end in contact with lug 57$^a$ and allowing the spring-pressed retaining member 59 to engage the top of the same. It will also be apparent that provision may easily be made for dropping the wooden blocks from a feeder above the machine; but as such feeder forms no part of the present invention, no further reference is made thereto.

As before suggested, it is preferred that the wood blocks 41 be compressed to about one-half their original lateral dimensions. In Fig. 11 is shown a horizontal sectional view of the block holding mechanism and the cross section dimensions of a block before compressing is indicated by the dotted lines. It will be seen that the lateral dimension of the block is approximately twice the width of the holder 57 and its adjacent supporting members. After the compression of the block and its release by the head 14, the rack 21 is caused to move in order to bring the block into contact with the shell matrix or holder and the shell carried thereby.

62 is a support for the shell holder or matrix 63. This support may be stationary and attached in any suitable manner to main frame 1 or, as shown in the drawings, it is preferred that it be mounted in some convenient manner independent of the main frame in order that it may carry a plurality of shell holders or matrices and present the same alternately to the filler plungers. As the matrix carrier forms no part of the present invention, further reference will not be made to the same except to say that a convenient form of such turret or carrier is shown and described in my co-pending application on brake-shoe machines already referred to.

In Fig. 14 is shown a side elevation of a sheet metal shell in position on the matrix 63. It will be seen that the shell is provided with a back member, and with side members and end members folded at an angle to the back member. For a detailed description of the shell reference may be had to the above mentioned co-pending application. The shell is provided with lugs 64ª and 64ᵇ held by the member 65, which is movably mounted in relation to members 62 and 63. When the filler plunger presses the block 41 into the shell under the pressure as described, the position assumed by the parts may be seen by reference to Fig. 4. It will be seen that the roller 61 engages the inclined surface 66 as the block is being inserted into the shell, thus raising the retaining clamp 59 from the top of the block and so preventing its being engaged by the adjacent end wall of the shell. It will be seen that if sufficient pressure be applied to the plunger, the back wall of the shell 64 will be caused to conform to the curved surface of the matrix 63 and the block 41, thus giving it the shape commonly required in brake-shoes. It will be apparent that the required degree of curvature may be given to the shells by other mechanism before they are brought to the machine for the purpose of being filled. If this method of manufacture be preferred, the strength of the parts embodied in the feeding mechanism may be decreased without affecting the value of the machine, since the amount of pressure required to insert the filling material in a completely formed shell will be much less than that required to complete the formation of the shell in the manner above described.

As already pointed out, it will be noted that the feeding mechanisms work alternately; that is, when one of the plungers is inserting a compressed block of wood into a shell the other plunger is withdrawn and is holding a block of wood under pressure. It will be noted that the matrix 63 is either stationary or if there be a plurality of matrices, that each stops at precisely the same point in relation to the machine, which, as it will be seen, is at a point just opposite or behind the abutting member 16. This makes it necessary that the feed plungers be deflected inwardly after passing forwardly and beyond the member 16. This deflection of the plunger is accomplished by means of the irregular slots 51ª which are traversed by the downwardly extending guide pins 50.

The reciprocating rack members 21 and 22 are held in position in their respective slots in the main frame by means of a suitable guide plate 67, which is provided with the forwardly extending side branches 67ª and 67ᵇ and the central branch 67ᶜ. It will be seen that the irregular shape given this member is for the purpose of permitting the reciprocation of members 21 and 22 on the main frame, since the upright standards 42 and 43 are carried thereby.

In order that the invention might be fully understood the details of an embodiment thereof have been thus specifically described, but what I claim is:—

1. The combination, in a brake-shoe machine, of a main frame, a stationary abutting member, a horizontally moving compressor head, a reciprocating carrier, means on said carrier adapted to receive a block or body of filling material, a shell holder or matrix, and means for controlling the movement of said carrier whereby it is adapted to present material to said stationary abutting member and to the said matrix or holder.

2. The combination, in a brake-shoe machine, of a main frame, an upwardly extending stationary abutting member secured to the main frame, a pair of horizontally moving compressor heads adapted to coöperate with the opposite sides of the stationary abutting member, means for alternately moving said compressor heads, and feed mechanisms adapted to enter between said compressor heads and the stationary abutting member.

3. The combination, in a brake-shoe machine, of a main frame, a stationary abutting member carried thereby, and a pair of feed mechanisms embodying filler block carriers and carrier controlling means adapted to cause the paths of movement of said carriers to converge at predetermined points.

4. The combination, in a brake-shoe machine, of a pair of alternately reciprocating feed mechanisms, embodying approximately parallel reciprocating supporting members and adjustably mounted carriers, a shell holder or matrix adapted to be supported in definite relation to said main frame, and means for deflecting the path of movement of said carriers whereby each is adapted to be moved into coöperative relation with said shell holder or matrix.

5. The combination, in a brake-shoe machine, of a main frame, a reciprocating member carried thereby, a filler block carrier pivotally connected to said reciprocating member, and means, carried by said main frame, adapted to deflect the movement of said carrier from the path of movement of said reciprocating member.

6. The combination, in a brake-shoe machine, of a main frame, a shell holder or matrix adapted to be supported in definite relation thereto, a pair of alternately moving compressor heads, and feed mechanisms adapted to coöperate with said compressor heads and with said shell holder or matrix.

7. The combination, in a brake-shoe machine, of a main frame, a shell holder or matrix adapted to be supported in definite relation thereto, a reciprocating compressor head, a stationary abutting member coöperating with said compressor head, a main driving shaft journaled in said main frame, means for imparting movement from said main shaft to said compressor head, and a feed mechanism adapted to coöperate with said compressor head and with said shell holder or matrix embodying a reciprocating member adjacent to said main driving shaft, a pair of eccentrally mounted cams carried on said driving shaft and anti-friction means mounted on said reciprocating member contiguous to said cams.

In testimony whereof I have signed my name to this specification, in the presence of two subscribing witnesses, on this 11th day of December A. D. 1906.

FREDERICK K. CASWELL.

Witnesses:
M. W. CANTWELL,
A. L. SPRINKLE.